Feb. 24, 1925.

T. H. HILL 1,527,800

ENGINE PISTON ROD LUBRICATOR

Filed Oct. 20, 1922  2 Sheets-Sheet 1

Inventor:
Thomas Henry Hill.
By Wiedersheim & Fairbanks.
Attorneys.

Feb. 24, 1925.
T. H. HILL
ENGINE PISTON ROD LUBRICATOR
Filed Oct. 20, 1922
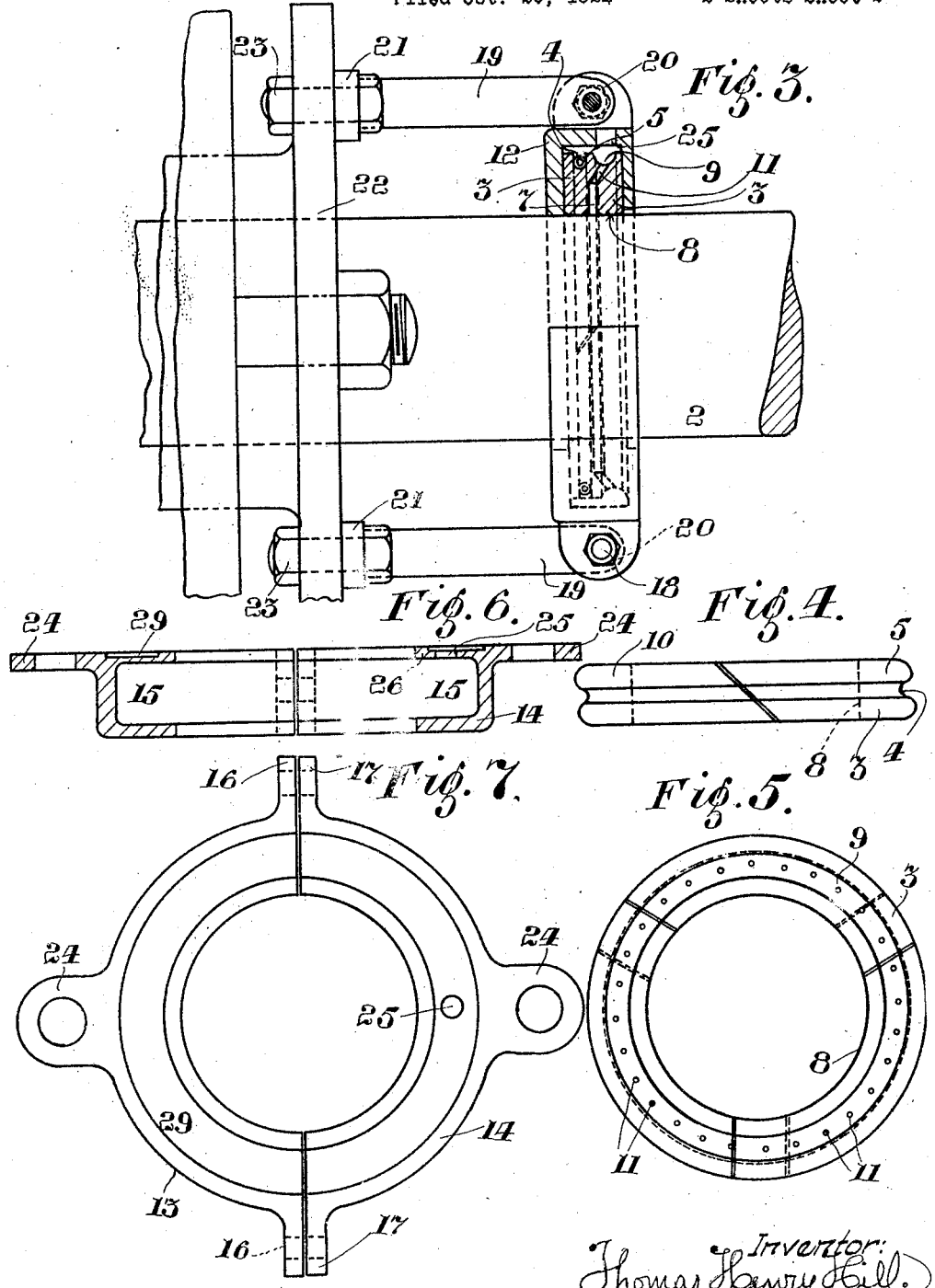

Patented Feb. 24, 1925.

1,527,800

UNITED STATES PATENT OFFICE.

THOMAS HENRY HILL, OF GLASGOW, SCOTLAND.

ENGINE PISTON-ROD LUBRICATOR.

Application filed October 20, 1922. Serial No. 595,768.

*To all whom it may concern:*

Be it known that I, THOMAS HENRY HILL, of 14 Percy Street, Ibrox, Glasgow, Scotland, a subject of the King of Great Britain, have invented a certain new and useful Engine Piston-Rod Lubricator, of which the following is a specification.

This invention relates to that type of lubricator for piston rods and the like reciprocating members, comprising a stationary housing or carrier, and a lubricant distributor ring of hard non-absorbent material contained in said housing or carrier and adapted to embrace the rod or reciprocating member.

An object of the present invention is to provide an improved lubricating device of the type stated whereby a more even distribution of the lubricant and, therefore, a more efficient and economical lubrication will be obtained.

Another object is to provide a lubricator of this type specially suitable for the lubrication of horizontally arranged members so as to obtain the advantages stated.

With this and other objects in view, my invention consists in the novel features of construction, combination and arrangement of parts as will be hereinafter referred to and more particularly pointed out in the specification and claims.

In order that the invention may be clearly understood and readily carried into effect, I have shown by way of example, various constructional forms of the lubricant distributing device embodying the invention in the accompanying sheet of drawings, whereon:—

Figure 3:
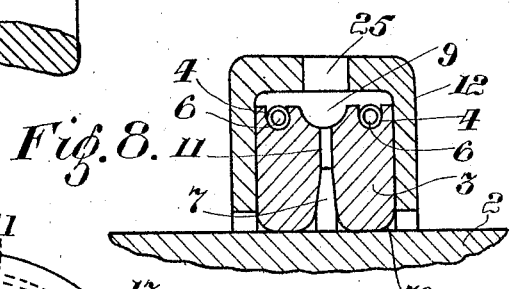
Fig. 3 is an elevation, partly in section, of another form applied to a horizontal rod or shaft.

Fig. 4 and Fig. 5 respectively, are an elevation and a plan of the distributing ring;

Fig. 6 is a sectional elevation and Fig. 7 a plan of a modified form of ring carrier; and Fig. 8 is a fragmentary sectional elevation of a modification of the arrangement shown in Fig. 3.

As illustrated, the lubricating device comprises essentially a distributing ring 3 which embraces the reciprocating rod or shaft denoted by the reference 2, and a ring carrier or housing 12. The ring may be made of a fibrous compound composition, phosphor-bronze, or like metal, and formed in segments, preferably three, as shown in Figure 5, having a circumferential groove, or grooves, 4 in its outer peripheral face 5 to accommodate a garter spring, or springs, 6, the purpose of which spring, or springs, is to secure the segments of the ring in position round the rod or shaft 2 and to press them resiliently into contact with same. Any other suitable means may, however, be employed in lieu of garter springs for ensuring that the ring segments will contact yieldingly with the rod.

The ring carrier 12 is preferably made in two semi-circular sections 13, 14 each shaped internally to provide a circumferential pocket 15 in which the distributing ring is accommodated when the device is assembled in position about the rod or shaft 2. The sections of the ring carrier are formed with diametrically opposite lugs 16, 17 by which the sections may be secured together as by means of bolts 18.

When placed on the rod or shaft 2, the device, as a whole, is fixed in position by suitable stays 19, attached, at their one ends 20, to the ring carrier between the lugs 16, 17, by means of the ring carrier bolts 18, their other ends 21 being secured to the gland cover, or flange 22 of the engine cylinder, or other stationary part of the machinery, by bolts, studs, or set pins 23, but, where it is not convenient or desirable to secure the stays 19 between the lugs 16, 17, the carrier may be provided with diametrically opposed lugs 24, Figs. 6 and 7, by which the carrier may be secured to the gland flange by studs, set pins, or bolts.

Figure 1:
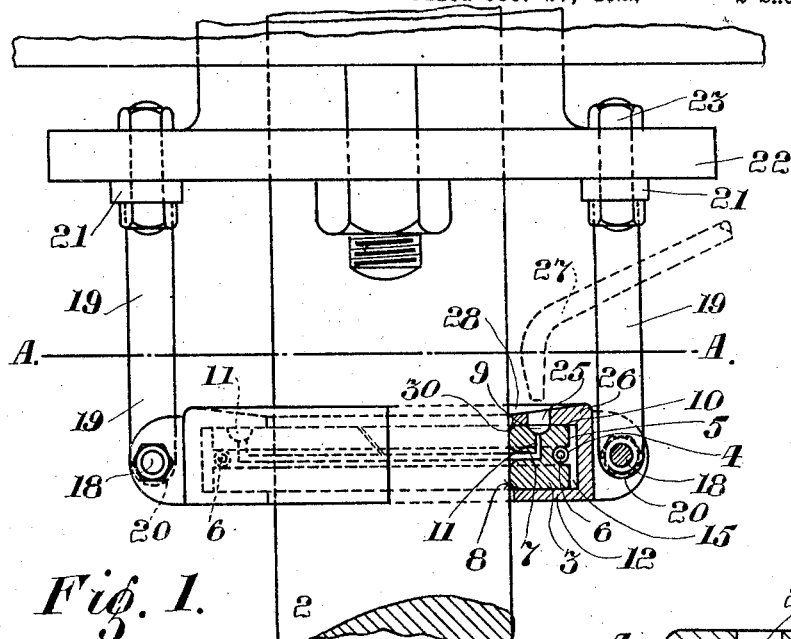
Fig. 1 is an elevation, partly in section, of one form of the device applied to a vertically reciprocating rod or shaft.
Figure 2:
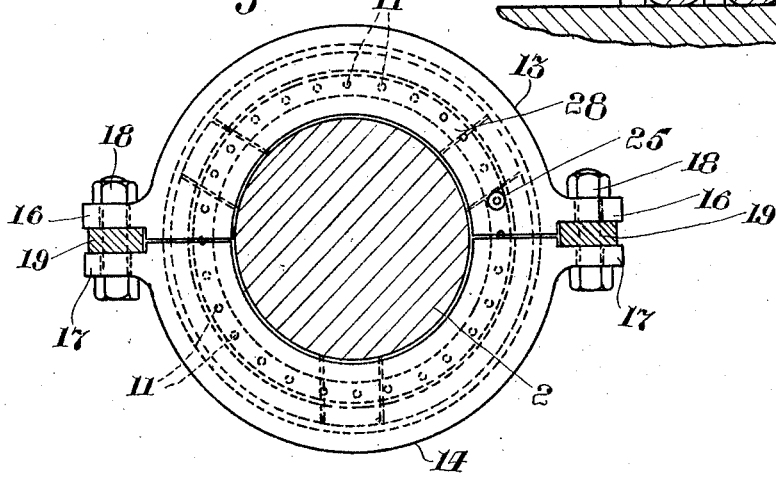
Fig. 2 is a sectional plan taken on the line A—A, Fig. 1.

In the construction illustrated by Figs. 1 and 2 the ring 3 has a circumferential distributing groove or channel 7 in its inner face 8 and has an annular channel 9 in its upper lateral face 10, communication being established between the annular channel and the distributing groove or channel for the passage of the lubricant by means of a series of holes 11. An opening 25 is provided in the upper wall 26 of the carrier through which lubricant is supplied from the pipe 27 (indicated in dotted lines, Fig. 1) connected with the source of lubricant supply or, if preferred, the lubricant may be fed by a wick or in any other suitable manner.

The upper face 28 of the wall 26 of the carrier may be inclined inwardly as shown to allow any lubricant, which may fall on to said face in the event of the point of the oil supply tube being displaced from over the hole 25, to flow inwards toward the shaft.

In some cases instead of inclining the upper face 28 a recess 29 may be formed therein as shown in Figs. 6 and 7.

In the form illustrated by Fig. 3 the annular channel 9 is made in the outer peripheral face 5 instead of in one of the lateral faces as in the previous construction and it is shown offset from the circumferential distributing groove a channel 7 having communication therewith for the passage of the lubricant by means of a series of inclined holes 11. The circumferential groove 4, accommodating the garter spring, is on the opposite side of the distributing groove or channel 7.

In the modification illustrated by Fig. 8 the annular channel 9 is centrally disposed in the outer peripheral face 5 of the ring and two circumferential grooves 4, 4, are provided one on each side of said channel for the garter springs 6, 6.

With each of these constructions lubricant supplied to the ring flows round the annular channel 9 and passes by the series of holes 11 to the circumferential distributing groove or channel 7 where it has free access to the peripheral surface of the rod 2 which, while reciprocating, draws an even film of lubricant with it and is thus continuously lubricated in an efficient manner without waste of lubricant.

If desired, the edges 30 of the circumferential distributing recess in the ring may be rounded off in order to assist the lubricant being taken up by the rod.

A lubricator constructed as hereinbefore described is continuous in action and effectively obviates hand lubrication of engine piston rods and like reciprocating members. It also effects a considerable saving in lubricant, prolongs the life of piston rod packings and avoids all danger of material damage due to inefficient lubrication.

Having now fully described my invention what I claim and desire to secure by Letters Patent is:—

1. A device for lubricating an engine piston rod or like reciprocating part of machinery, comprising a housing, a divided distributor ring of hard non-absorbent material in said housing for embracing said part and formed with a circumferential channel in its inner face and with a plurality of radial ports leading to said channel, means for distributing oil to said radial ports and means for constraining said ring yieldingly into contact with the part to be lubricated.

2. A device for lubricating an engine piston rod or like reciprocating part of machinery, comprising a housing, a divided distributor ring of hard non-absorbent material in said housing for embracing said part and formed with a circumferential channel in its inner face, an annular channel in its outer face, a plurality of radial distributing ports connecting said channels and means for constraining said ring yieldingly into contact with the part to be lubricated.

3. A device for lubricating an engine piston rod or like reciprocating part of machinery, comprising a housing, a divided distributor ring or hard non-absorbent material in said housing for embracing said part and formed with a circumferential channel in its inner face, and an annular channel in its outer face, a plurality, of radial distributing ports connecting said channels, and a garter spring for constraining said ring yieldingly into contact with the part to be lubricated.

4. A device for lubricating an engine piston rod or like reciprocating part of machinery, comprising a divided distributor ring of hard non-absorbent material for embracing said part and formed with a circumferential channel in its inner face, and an annular channel in its outer face, a plurality of radial distributing ports connecting said channels, a garter spring for constraining said ring yieldingly into contact with the part to be lubricated, and a housing for said ring formed with a lubricant supply opening communicating with the annular channel in said ring.

5. A device for lubricating an engine piston rod or like reciprocating part of machinery, comprising a housing formed in two sections, a metallic distributor ring for embracing said part and formed with a circumferential channel in its inner face and an annular channel in its outer face, a plurality of radial distributing ports connecting said channels, said housing for the ring having a lubricant supply opening therein communicating with the annular channel in said ring, and a garter spring for constraining said ring yieldingly into contact with the part to be lubricated.

In testimony whereof I affix my signature in presence of two witnesses.

THOMAS HENRY HILL.

Witnesses:
  STANLEY DUNLOP,
  EDITH MARY ROLLO.